United States Patent [19]

Saunders, IV

[11] 4,320,906
[45] Mar. 23, 1982

[54] TURN SIGNAL SUBASSEMBLY FOR USE IN COMBINATION WITH HANDLEBAR MOUNTED BREAKAWAY MOTORCYCLE WINDSCREEN

[76] Inventor: Charles A. Saunders, IV, Box 1246, Columbus, Nebr. 68601

[21] Appl. No.: 125,181

[22] Filed: Feb. 27, 1980

[51] Int. Cl.³ .............................................. B62J 17/04
[52] U.S. Cl. ................................ 280/289 S; 296/78.1; 340/97
[58] Field of Search .................. 280/289 S, 289 R; 296/78.1; 340/97

[56] References Cited

U.S. PATENT DOCUMENTS 4,019,774 4/1977 Tsukahara ........................ 296/78.1
4,087,110 5/1978 Vetter .............................. 296/78.1

FOREIGN PATENT DOCUMENTS 2335391 7/1977 France .............................. 280/289 S Primary Examiner—John P. Silverstrim
Attorney, Agent, or Firm—Edwin L. Spangler, Jr.

[57] ABSTRACT

This invention relates to a motorcycle turn signal subassembly including a pair of turn signals, the electrical parts and the mounting hardware therefor for use in combination with the mounting hardware for a breakaway-type handlebar mounted windscreen in place of the latter or in combination therewith so as to retain its breakaway capabilities by disconnecting the hardware connection and providing a quick-disconnect coupling between the electrical system and the lamp housing.

5 Claims, 6 Drawing Figures

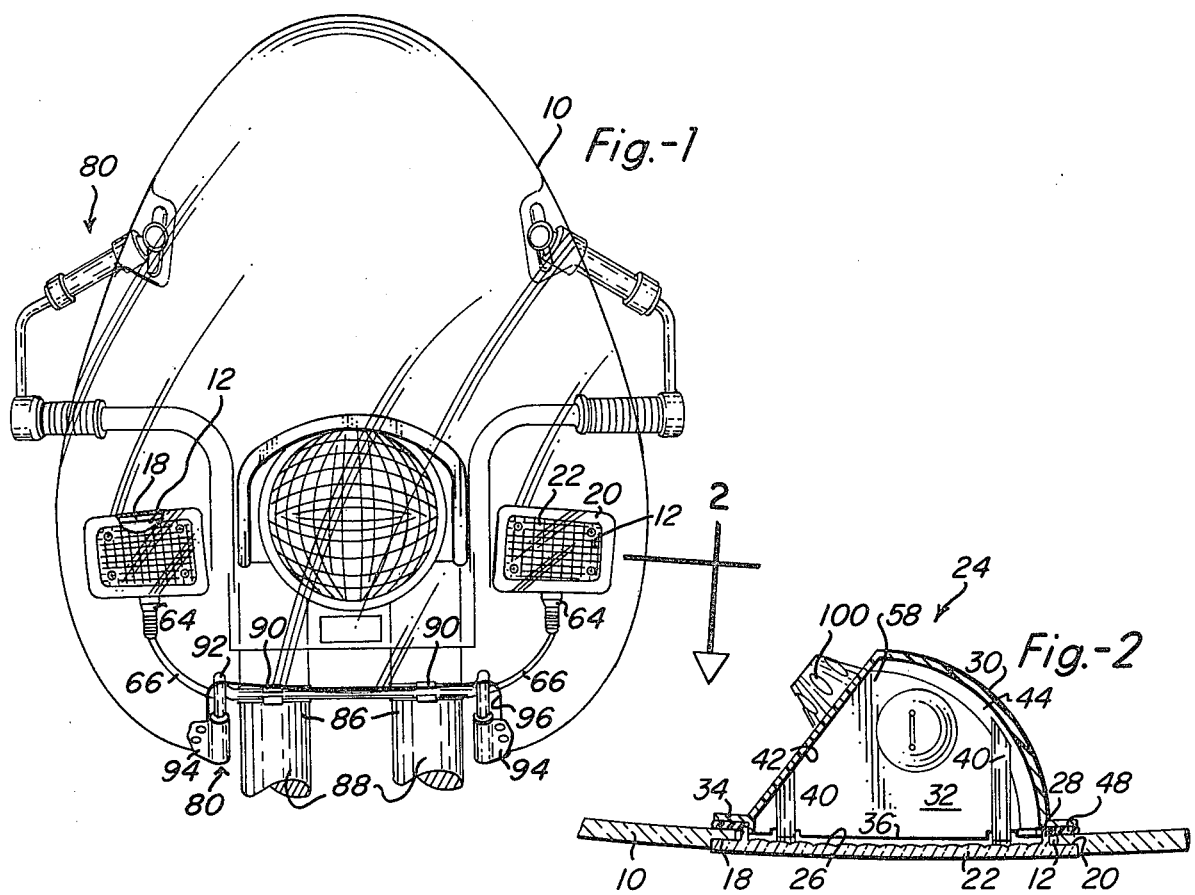
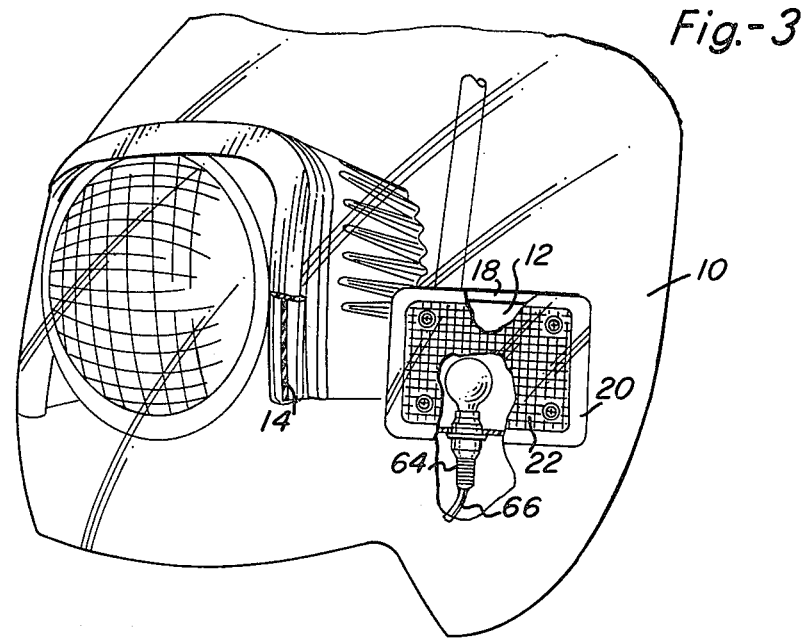

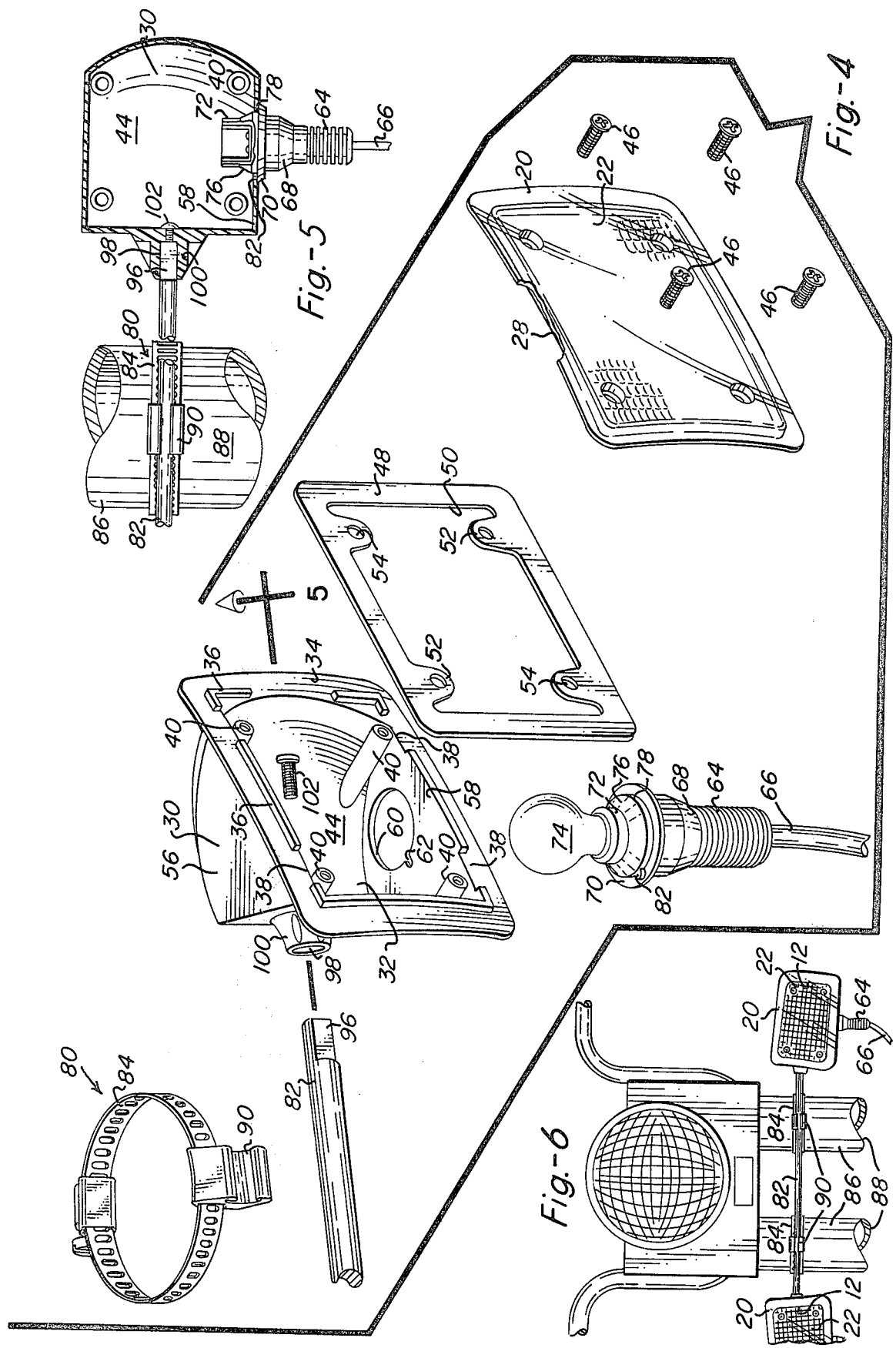

TURN SIGNAL SUBASSEMBLY FOR USE IN COMBINATION WITH HANDLEBAR MOUNTED BREAKAWAY MOTORCYCLE WINDSCREEN

In my U.S. Pat. No. 4,166,650 which is the closest prior art I am aware of, I disclose a uniquely-shaped breakaway-type handlebar mounted motorcycle windscreen which will separate from the vehicle upon the application of a forwardly-directed blow of a predetermined magnitude selected to insure that the driver is not injured by such a blow such as is all too often the case in an automobile. In my copending application Ser. No. 24,954, now U.S. Pat. No. 4,262,959, I disclose a pleated boot which attaches to an inverted U-shaped slot in the windscreen and shield the top and sides of the headlight that is fully compatible with the breakaway capabilities of the windscreen.

The subject matter of the instant application is a turn signal subassembly specifically designed for use with my windscreen in a manner such that its breakaway capabilities are preserved or, alternatively, with the mounting hardware for the latter by itself on those occasions where the user wishes to ride without a windscreen yet have front turn indicators. The lamps and wiring harness of the electrical system remain attached to the motorcycle more or less permanently regardless of whether the windscreen is used or not. With the windscreen in place, it provides the structural support for the lamp housings, bulbs and sockets therefor. Conversely, these housings cooperate with the windscreen to produce a unitary assembly having greater structural integrity than the windscreen by itself while, at the same time, completing the smoothly-contoured forwardly-facing surface thereof. When thus installed as an integral part of the windscreen the electrical parts attached to the motorcycle must not interfere to any appreciable extent with the breakaway capabilities of the assembly; therefore, the lamp sockets that form a part of the wiring harness cooperate with the lamp housings to form quick-disconnect couplings. Alternatively, when the windscreen is demounted from the motorcycle, the mounting hardware ordinarily used to support the windscreen in breakaway relation serves to mount the turn signal subassembly through the use of accessory hardware detachably connectable within suitable sockets in the lamp housings.

It is, therefore, the principal object of the present invention to provide a novel and improved turn signal subassembly specifically designed for use in combination with my patented windscreen or alternatively the hardware mounting the latter on the fork of a motorcycle.

A second objective of the within described invention is the provision of a subassembly of the type aforementioned with preserves intact the breakaway capabilities of the windscreen.

Another object is to provide a set of turn signals which integrate into the windscreen so as to maintain the smoothly-curved aerodynamic contours of its forwardly-facing surface.

Still another object is to provide a pair of turn signal lamp housings that cooperate with the windscreen when installed in suitably shaped apertures therein to reinforce the latter such that the elements of the assembly have a greater structural integrity than any element possesses by itself.

An additional objective of the herein described invention is that of providing a turn signal subassembly with a quick-disconnect coupling between the lamp housing attached to the windscreen and the bulb holder or lamp socket that constitutes part of the wiring harness that remains on the motorcycle at all times regardless of whether the windscreen is in use or not.

Further objects are to provide a pair of motorcycle turn signals and the wiring harness therefor that are lightweight, bright, easily seen, safe, compact, versatile and highly decorative.

Other objects will be in part apparent and in part pointed out specifically hereinafter in connection with the description of the drawings that follows, and in which:

FIG. 1 is a fragmentary front elevation showing the front fork of the motorcycle with the windscreen including the turn signal subassembly in place thereon;

FIG. 2 is a fragmentary section to a greatly enlarged scale taken along line 2—2 of FIG. 1;

FIG. 3 is a fragmentary perspective view showing the windscreen, motorcycle headlight, headlight boot and left turn signal to a scale in between that of FIGS. 1 and 2;

FIG. 4 is an exploded perspective view to approximately the same scale as FIG. 2 showing the parts of the lamp housing, the quick-disconnect coupling between the latter and the lamp socket of the wiring harness, the rod which is used to fasten the lamp housings to the mounting hardware for the windscreen when no windscreen is used, and the fork clip which forms a part of such hardware;

FIG. 5 is a section similar to FIG. 2 and to approximately the same scale showing the elements of FIG. 4 in assembled relation; and, FIG. 6 is a fragmentary view partly in section and partly in elevation taken to approximately the same scale as FIGS. 2 and 5 showing the manner in which the turn signal subassembly is fastened directly to the mounting hardware for the windscreen.

Referring next to the drawings for a detailed description of the present invention and initially, to FIGS. 1, 2 and 3 for this purpose, reference numeral 10 represents a windscreen of the type shown and described in my U.S. Pat. No. 4,166,650 modified only to the extent that it is provided with a pair of transversely-spaced generally rectangular openings 12 positioned alongside the inverted U-shaped slot 14 (FIG. 2) that receives the headlight boot 16. These openings are both bordered by a recessed marginal portion 18 sized and shaped to receive the rim 20 bordering the lens 22 of the lamp housing which has been broadly indicated by reference numeral 24.

The front surface of lens 22 including marginal flange 20 is smooth and shaped to maintain the precise aerodynamic contour of the windscreen across opening 12 as it seats in flush relation recessed within marginal portion 18 as revealed most clearly in FIG. 2. The pebble-surfaced light dispersal feature 26 (FIG. 2) of the lens is, therefore, confined to its inside surface so as to leave the front smooth. The lens is, of course, transparent and either amber colored or used with an amber bulb to comply with the statutory requirements for front turn signals.

Looking next at FIGS. 2, 4 and 5, it will be seen that an integrally-formed rib 28 borders the centrally-located pebble-surfaced portion of the lens and separates it from rim-forming flange 20. This rib projects inwardly or rearwardly toward the driver and, in the particular form shown, fits loosely inside windscreen opening 12. Marginal flange 20 and recess 18 cooperate to align the lens within opening 12 in the windscreen, therefore, rib 28 is not required for this purpose.

Lamp housing 30 has the lens-receiving opening 32 in the front thereof rimmed by a marginal flange 34 having an interrupted rib 36 projecting forwardly therefrom in position to telescope inside rib 28 on the rear face of the lens. The breaks or interruptions 38 in rib 36 are most clearly revealed in FIG. 4 where they will be seen to lie adjacent each of the four screw-receiving internally threaded bosses 40 projecting forwardly from the reflecting surfaces 42 and 44 of the lamp housing. Screws 46 thread into these bosses with the heads thereof countersunk in the front surface of lens 22 thus fasteneing it to the lamp housing in the conventional manner with gasket 48 interposed therebetween to produce both a fluid and light-tight seal. The cut-out 50 in this gasket is sized and shaped to receive the forwardly-projecting interrupted rib 36 of the lamp housing with the ears 52 thereof projecting through the interruptions 38 therein to a position covering the bosses 40 where they are provided with screw apertures 54. Rearwardly projecting rib 28 on the inside of lens 22 is larger than the cut-out 50 in the gasket 48 and, therefore, when tightened into impinging relation thereagainst, they cooperate to produce the desired seal.

It should also be noted in connection with FIG. 2 that the depth of lens rib 28 is substantially greater than the thickness of the recessed portion 18 of the windscreen that borders opening 20 therein. This means, of course, that even when the turn signals are used with the windscreen, rib 28 can reach through opening 20 far enough to engage and compress gasket 48 against lamp housing flange 34 thus producing the desired seal.

Now, returning once again to FIGS. 2, 4 and 5, it will be seen that the lamp housing has two forwardly-facing reflecting surfaces, the first an essentially planar one 42 and the second a parabolic one 44. Both of these surfaces are preferably silvered as are the lamp housing walls 56 and 58 located above and below the latter, respectively. In the installed position shown in FIGS. 1, 2 and 6, the planar faces 42 of the pair of lamp housings lie in essentially spaced parallel relation to one another while the parabolic surfaces 44 reflect the light almost directly forward, i.e. parallel to planar surfaces 42 and through the lenses at an angle of 45°. By so doing, a person facing the oncoming motorcycle would rarely be confused as to which of the two signals was flashing. Moreover, somewhat less than 60° movement to one side or the other off the centerline between the signals results in only one of the two being visible at all and it is the one that signifies a turning movement in a direction toward the observer.

The bottom wall 58 of the lamp housing contains a circular aperture 60 with an alignment notch 62 at one point on its periphery as can best be seen in FIG. 4 to which detailed reference will next be made. This aperture cooperates with rubber-covered lamp socket 64 of the wiring harness 66 to define a quick-disconnect coupling effective to release the harness from the housing whenever the windscreen breaks away from the motorcycle upon the application of a forwardly-directed impact blow thereagainst.

FIGS. 4, 5 and 6 will be referred to next for a detailed description of this quick-disconnect coupling. The body 68 of the socket is bordered intermediate its ends by an annular stop flange 70 which rests against the underside of bottom lamp housing wall 58 when socket 64 is detachably seated in opening 60. The hollow cylindrical neck 72 of socket 64 projects up through opening 60 into the interior of the lamp housing where it receives bulb 74. Neck 72 accepts the bulb with a bayonet connection of the well-known type. The pins on in the base of the bulb (not shown) make electrical contact with the conductive part of the socket housed inside the rubber case.

The key to the quick-disconnect coupling is the elastic upwardly-tapered frustoconical annular flange 76 which encircles neck 72 in spaced relation above stop flange 70 so as to define an annular groove 78 therebetween. This groove is sized to receive the portion of the bottom lamp housing wall bordering opening 60 therein. The tapered surface of flange 76 engages the border of wall opening 60 at some point above its lower edge causing it to deflect to the extent necessary for it to pass on through the opening; whereupon, it resumes its original shape once the wall 58 is seated in groove 78. The resulting connection is entirely adequate to resist vibration, road shocks and the like, yet, it will disconnect upon application of an impact blow to the rear or driver's side of the windscreen of a magnitude effective to separate the latter from the motorcycle. Thus, when the signal subassembly is attached to the windscreen as shown in FIGS. 1, 2 and 3, the lamp housings will remain with the windscreen as it is broken away from the motorcycle while the wiring harness 66 remains connected to the latter along with the windscreen mounting hardware which has been broadly referred to by reference numeral 80 and which is described in detail in my U.S. Pat. No. 4,166,650 previously noted. The maximum radius of flange 76 is only a matter of a tiny fraction of an inch or so greater than that of opening 60, therefore, separation takes place rather easily yet remains adequate to maintain the coupling under ordinary operating conditions.

One remaining feature of the socket is integral detent 82 that must register with notch 62 in the lamp housing wall to properly complete the connection. The main purpose of the detent and notch is to keep the socket from turning in hole 60 so as to maintain the bulb filament in proper relation to the parabolic curve.

Finally, particular reference will be made to FIGS. 4, 5 and 6 where the embodiment is shown wherein the turn signal subassembly of the present invention is shown connected directly to the windscreen mounting hardware 80 by means of accessory rod 82. The windscreen mounting hardware 80 is the same as that shown in my patent and, for this reason, only certain portions of it need to be described here. Adjustable clamps 84 of standard design encircle the legs 86 of motorcycle fork 88 thus attaching clips 90 thereto. Ordinarily, as shown in FIG. 1, the crossbar 92 extending between the fittings 94 fastened alongside the cut-out 96 in the bottom edge of the windscreen detachably fasten into these clips 90; however, when no windscreen is used, these same clips are used to mount the turn signals.

In the particular form shown, accessory rod 82 is straight which means that the turn signals will be dropped down a few inches from the position they occupy in the windscreen unless, of course, clamps 84 are raised up higher on the legs of the fork. This, obviously, is a matter of personal preference and has nothing to do with the invention. The ends of rod 82 are provided with flats 96 which cooperate with similarly shaped sockets 98 in the boss 100 projecting from the planar reflecting surface 42 of the lamp housing to prevent the latter from turning on the rod and also to maintain their same attitude relative to the other lamp housing. The ends of the rod are drilled and tapped to accept screws 102 which hold the parts in assembled relation. The resulting assembly retains all the features of the windscreen mount and greatly increases the versatility of the whole combination.

What is claimed is:

1. In combination: a breakaway fairing for use on a motorcycle having a frame with a front fork supporting a steerable wheel and handlebars attached to said fork, said fairing including an upper pair of mounting brackets depending from the handlebars, a lower mounting bracket depending from the fork and a windscreen removably connected to said upper and lower mounting brackets for detachment therefrom upon the application of a forwardly-directed impact blow to the rear face thereof of a predetermined magnitude; and, a turn signal subassembly including a pair of lamp housings containing transparent lenses attached to the windscreen in transversely-spaced relation and a wiring harness mounted upon the motorcycle frame, said wiring harness having one end connectable to a source of electrical energy carried by the motorcycle and the other end provided with a pair of lamp sockets detachably connected to the lamp housings with a quick-disconnect coupling, said quick-disconnect coupling being effective to detach the wiring harness from the lamp housing upon the application of an impact blow to the windscreen of a magnitude capable of separating same from the motorcycle.

2. The combination of claim 1 wherein said lamp housings include a socket-receiving opening communicating the interior thereof, and wherein said quick-disconnect coupling comprises wiring harness sockets covered with an elastic material and shaped to define at least a first flange-like projection that is oversize with respect to said socket-receiving opening, said projection being deformable to the extent required for insertion and removal of said socket with respect to said lamp housing, said projection being effective upon insertion to maintain the socket in assembled relation inside said lamp housing so long as the windscreen remains mounted on the motorcycle, and said projection being operative to deform and release said socket from said lamp housing upon detachment of the windscreen from the motorcycle without materially increasing the magnitude of the impact blow necessary to effect separation therebetween.

3. The combination as set forth in claim 2 wherein said first flange-like projection comprises an annular frustoconically-shaped flange tapered in the direction in which the socket is inserted into the socket-receiving opening in the lamp housing.

4. The combination as set forth in claim 2 wherein said wiring harness sockets include a second flange-like projection spaced from the first and cooperating therewith to define an annular groove sized to receive the portion of the lamp housing bordering the socket-receiving opening therein, said second flange-like projection being oversize with respect to said socket-receiving opening and effective to limit the degree of penetration of the socket into the lamp housing.

5. The combination as set forth in claim 4 wherein said second flange-like projection includes an integrally-formed detent projecting into the annular groove and wherein the socket-receiving opening in the lamp housing is notched to receive said detent when said socket and lamp housing are in assembled relation, said detent and notch cooperating with one another in aligned relation to prevent relative rotation between said socket and the lamp housing therefor.

* * * * *